Dec. 4, 1962 S. BÖHM 3,066,590
FOCAL PLANE CAMERA SHUTTER
Filed Sept. 19, 1957 2 Sheets-Sheet 1
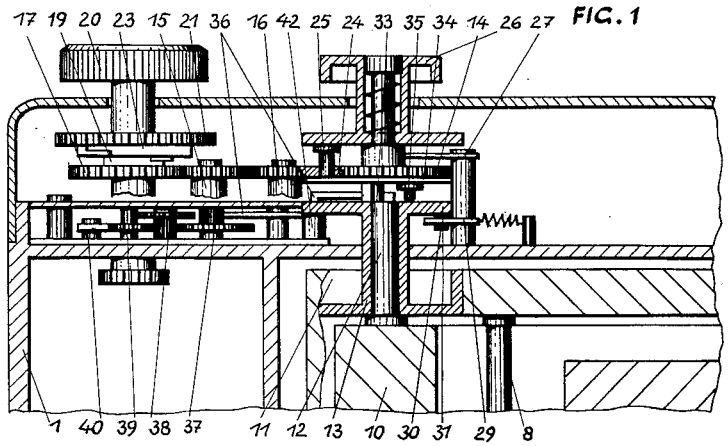
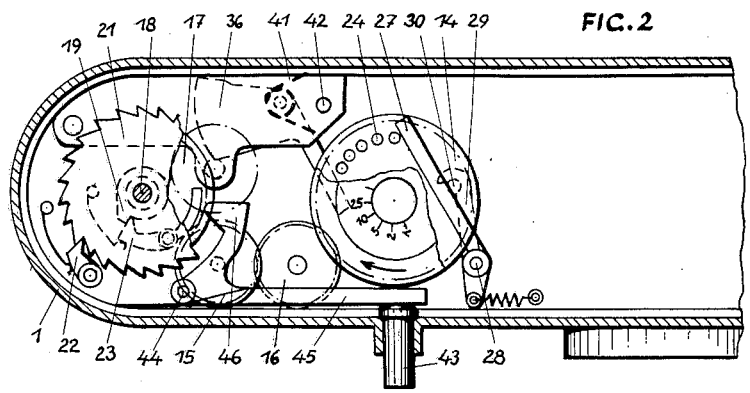
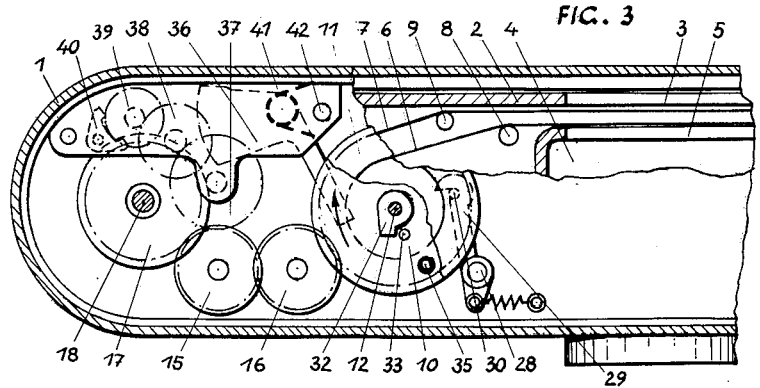
INVENTOR.
Siegfried Böhm Dec. 4, 1962 S. BÖHM 3,066,590
FOCAL PLANE CAMERA SHUTTER
Filed Sept. 19, 1957 2 Sheets-Sheet 2
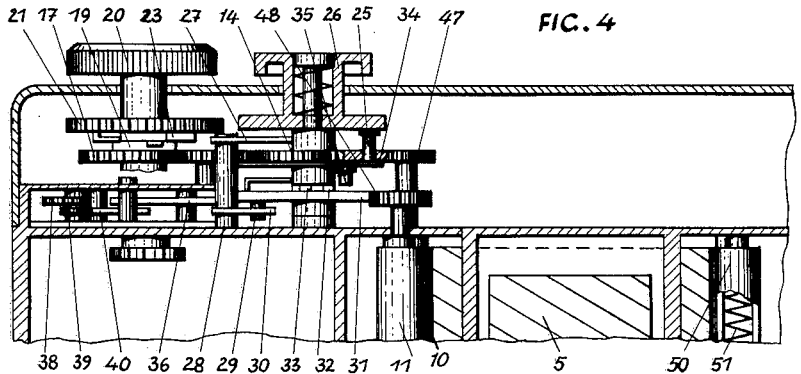
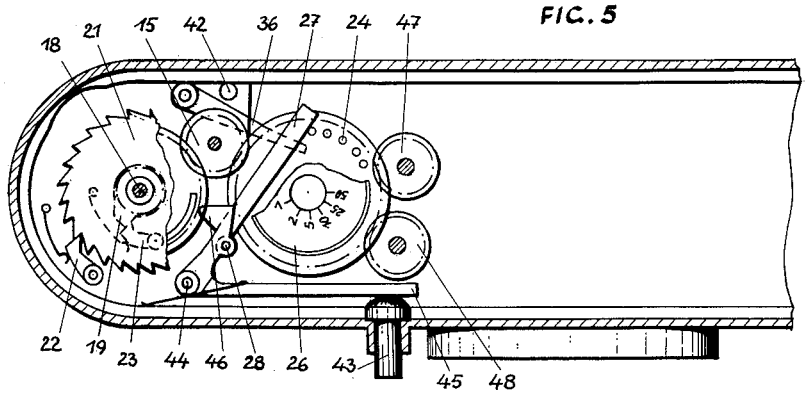
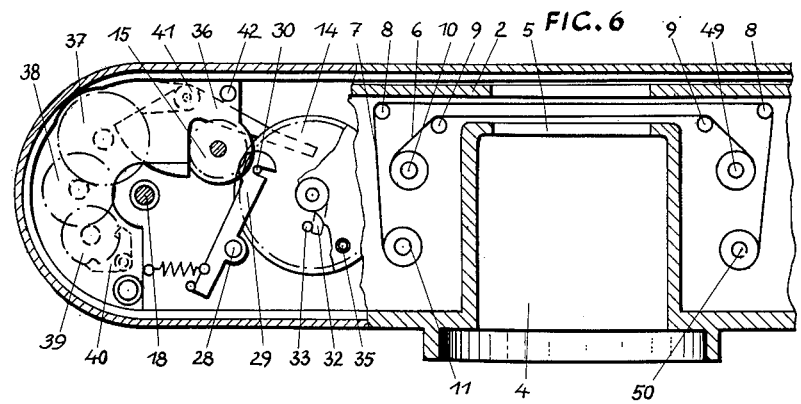
INVENTOR.
Siegfried Böhm

United States Patent Office 3,066,590
Patented Dec. 4, 1962

3,066,590
FOCAL PLANE CAMERA SHUTTER
Siegfried Böhm, Dresden, Germany, assignor to VEB Kamera- und Kinowerke Dresden
Filed Sept. 19, 1957, Ser. No. 684,979
4 Claims. (Cl. 95—57)

This invention relates to an arrangement for timing and regulating the length of exposure in photographic cameras equipped with a focal plane shutter.

Different types of focal plane shutters for photographic cameras are known whose main feature is that two shutter members, for instance two rectilinearly guided curtains, slides or two partially or fully rotating circular parts or laminations, are moved past the picture gate in such manner that one member when clear of the gate admits light for exposure and the other member covers the gate again during its subsequent movement. With these known focal plane shutters the duration of exposure is regulated by causing both members to run off simultaneously at the release of the shutter and retarding the movement of the second member by one or more braking mechanisms. The width of the slit formed by the two shutter members passing the gate is thereby altered and so is the length of exposure.

In order to obtain exposure times ranging from one second to one thousandth part thereof, the conventional focal plane shutters require for their operation an extensive arrangement of gears and adjusting and controlling means. To obtain the wide range of exposures mentioned, the light-admitting shutter member must always, even for longer exposure periods, be moved past the gate at a speed permitting the shortest exposure of a thousandth second so as to avoid distortion and lack of definition. The following or second shutter member has to be moved past the gate at the same speed and, for longer exposures, fitted with several braking mechanisms, since one would not suffice for its regulatable retardation within the entire range of exposures. One mechanism would be needed for short exposures and the other or others for longer exposures, which require to be started and stopped by cam and change gears for different exposure times.

The invention proposes an arrangement for timing and regulating the duration of exposures in photographic cameras fitted with focal plane shutters without employing complicated mechanisms. According to the invention the width of the slit is altered by providing the light-admitting shutter member or its drive with regulatable control means for the release of the second shutter member and also with means for retarding it, as a brake mechanism, in such manner that retardation occurs only after the shutter member effecting the exposure has been completely moved past the gate.

Owing to this construction and arrangement, both the light-admitting member of the shutter and the following second light-closing member are moved past the gate at constant speed, whereby constancy of operation for all exposure times is ensured. Furthermore, contrary to known constructions, retardation is brought about not by the second shutter member but by means associated with the first or light-admitting shutter member. Retardation becomes effective only after this member has been moved completely past the gate. Thus the considerable advantage is gained that retardation has no unfavorable effect upon the uniform release of the light-admitting member and therefore the provision of a single brake mechanism will suffice to get exposures within the range of one second to one thousandth part thereof by a correspondingly retarded release of the second shutter member.

The suggested arrangement affords also the added advantage of a simple structure, since the brake mechanism may be controlled by a constant stop provided on the light-admitting shutter member or its drive, said stop actuating the brake mechanism only after this shutter member has fully passed the gate. As the brake mechanism does not require cam or change gears, it may be stationarily positioned without additional setting means.

Different exposure times are adjusted according to the invention by a single means disposed directly on the light-admitting shutter member or its drive and consisting of an index plate having perforations in which an index pin connected with the time setting knob can be arrested. When the connecting shutter member runs off, the index pin releases the locking lever for the following shutter member and thereby the motion thereof. The length of exposures can be changed by inserting the index pin in perforations of the index plate, which are spaced according to different exposure times.

The invention is not restricted to a particular type of photographic camera, but may be applied to all focal plane shutters wherein the forming of the slit and thereby the exposure are effected by at least two shutter members. The invention is therefore applicable to photographic cameras fitted with shutters of the focal plane type comprising two members having the form of rectilinearly guided curtains, slides or partially or completely rotating circular parts or laminations.

The invention is illustrated in the accompanying drawings, wherein FIGURES 1 to 3 show an application of the invention to a focal plane shutter consisting of two curtains with coaxially arranged rollers, and FIGS. 4 to 6 show a focal plane shutter consisting of two curtains with their rollers placed side by side and driven by a special gear. In the drawings, FIGURE 1 is a partial sectional front view, FIG. 2 a partial sectional top view of FIG. 1, FIG. 3 a similar partial sectional top view taken at a different level, FIG. 4 a partial sectional front view of a modification, and FIGS. 5 and 6 are partial sectional top views of the camera shown in FIG. 4.

In the construction shown in FIGS. 1 to 3 numeral 1 indicates the camera body, 2 is the film support or stage with a picture gate 3, and 4 is a light shaft having an aperture 5 corresponding to the size of the gate 3. Between the stage 2 and the light shaft 4 sufficient space is left to allow two curtains 6 and 7 of the focal plane shutter to move past the gate and aperture cutouts 3 and 5. The curtain 6 admits light for exposure and curtain 7 covers the aperture again, both curtains being guided by rolls 8 and 9. Curtain 6 is driven by a roller 10 to which it is secured, and curtain 7 is fastened to a double-sided roller 11. Both rollers 10, 11 are coaxially disposed in the camera body 1, shaft 12 of roller 10 passing through a hollow shaft 13 of roller 11.

The rollers 10, 11 and thereby the shutter are rolled up as follows:

To the shaft 12 of roller 10 a gear wheel 14 is secured and by way of intermediate gears 15, 16 is connected with a gear 17 which is rotatable about the journal bearing 18 and to which a driver 19 having the form of a ratchet cam is firmly connected. Over gear 17 a winding knob 20 is removably fastened to which a ratchet wheel 21 is secured which cooperates with a pawl 22 permitting rotation of winding knob 20 only in the winding direction. On the ratchet wheel 21 a pawl 23 is provided which at rotation of the winding knob 20 actuates the driver 19 and thereby the gearing connected with it, the latter comprising gears 17, 16, 15, 14 and the curtain roller 10 together with the curtain 6 secured thereto. The gear 14 connected with the curtain roller 10 is formed to act also as index plate and provided with perforations 24 which are engageable by an index pin 25 secured to a time setting knob 26. The latter is axially displaceable on shaft 12 of roller 10 and is pressed downwardly each time by a spring. By raising the time setting knob 26, the index pin 25 can be lifted out of one of the perforations 24 and inserted in another one. The index pin 25 controls also the release of curtain 7 by striking when curtain 6 runs out against a one-armed lever 27 fastened to a rotatably mounted shaft 28 to which is firmly connected a spring-actuated check lever 29. The latter when in locking position engages a stop pin 30 connected to a disc 31 secured to roller 11. By disengaging the check lever 29 from the stop pin 30 the roller 11 and thereby the curtain 7 is released. It is wound up again by a driver 32 secured to gear 14 and striking pin 33 which is fastened to disc 31. To the gear 14 is secured also a disc 34 with a pin 35 which during the running-off of curtain 6 and its roller 10 strikes a toothed segment 36 of a brake mechanism comprising also driving gears 37, 38, 39 and a tie-rod 40. The toothed segment 36 is returned to the initial position by a spring 41 and stopped by a stay-bolt 42. The shutter is released by a releasing member 43 which moves a lever 45 placed around a fulcrum 44 and whose cam 46 releases the pawl 23 secured to ratchet wheel 21 of winding knob 20.

The mode of operation of the arrangement is as follows:

In the construction according to FIGS. 1 to 3 the shutter gear is shown in a position when the shutter is wound, and the movement of the two curtains 6, 7 is effected in non-positive manner by spring-actuated counter-rollers 49 and 50 as shown in FIGS. 4 to 6.

At release of the shutter by member 43, the pawl 23 is lifted by way of lever 45, whereby the driver 19 with the driving gear including gears 17, 16, 15, 14 and roller 10 with curtain 6 is released; also, and the gearing rotates in the direction of the arrow. During this movement curtain 6 admits light and the index pin 25 strikes lever 27 and swivels it together with the check lever 29 connected therewith which thereby is caused to release locking pin 30 firmly connected with roller 11 by a disc 31 whereby roller 11 and curtain 7 are also released. After curtain 6 has been moved past the gate with its part effecting exposure and while roller 10 is running off, the pin 35 connected with roller 10 by the disc 34 strikes the toothed segment 36 of the brake mechanism with gears 37, 38, 39 and tie-rod 40, whereby further motion of the curtain is correspondingly retarded until its end position has been reached.

It will now be explained that for short exposure times the braking mechanism becomes engaged after the curtain 7 has been released and thus is not effective to retard the release, while for long exposure times, the curtain 7 is released during the period of effectiveness of the brake mechanism (37, 38, 39, 40) on the motion of the curtain 6, whereby the exposure time is lengthened.

The roller 10, which is rigid with the release curtain 6, carries the index gear 14. The indexing pin 25 is inserted in any desired indexing perforation 24, depending on the desired exposure time.

For short exposure times, the indexing pin 25 is inserted in one of the perforations 24 so positioned that the indexing pin 25 reaches and releases the closure shutter mechanism 27, 28, 29 and 30, prior to engagement of the brake mechanism (37, 38, 39, 40).

The brake mechanism is actuated by the pin 35 on the disk 34 which is rigid with the indexing gear 14. After the indexing gear 14 has rotated through an angle which carries the release curtain 6 to a position in which the window 5 is completely open, the pin 35 engages the arm of the gear segment 36, thereby coupling the brake mechanism 37, 38, 39 and 40 to the gear 14. The brake mechanism retards the subsequent angular motion of the indexing gear 14 and incidentally also of the run off curtain 6.

For longer exposure times, the brake mechanism 37, 38, 39 and 40 becomes effective before the pin 25 strikes arm 27 and releases the closing curtain 7. Thus the brake mechanism retards the time at which the closing curtain 7 is released compared to the time it would have been released in the absence of such brake mechanism.

The arrangement and operation of the design shown in FIGS. 4 to 6 differs from the construction according to FIGS. 1 to 3 chiefly insofar as the drive of the two curtains 6, 7 and the setting means for the exposure time are not directly provided on their rollers 10, 11, but the curtains 6, 7, arranged at a distance from each other, are connected with their driving gears 47, 48 by a gearing. Furthermore, counter-rollers 49, 50 are used which by the action of a spring 51 cause running-off of the curtains 6, 7 and of the shutter. In both constructions the gear ratios are so chosen that at rewinding of the shutter by knob 20 the pawl 23 is placed in a position ensuring release by member 43 by way of lever 45.

I claim:

1. A camera of the focal plane shutter type comprising a housing, an objective lens mounted in said housing, a first curtain means mounted in said housing capable of being operated so as to selectively pass over a light sensitive film and having a trailing edge which during operation first exposes the film to light from said objective lens, a second curtain means mounted in said housing capable of being operated so as to pass over the film and having a leading edge which during operation shuts off light from said objective lens to the film when said curtain passes said film, means for initiating operation of said first curtain means, a starter member connected to said first curtain means for movement with said first curtain means, brake means positioned in the path of said starter member and actuated by engagement with said starter member after movement of the leading edge of said first curtain means past said film, said brake means being actuated by said starter member for retarding movement of said first curtain means, and actuating means connected to said first curtain means adjustable with respect to said starter member to a plurality of positions at least one of which is effective for initiating motion of said second curtain means only after said starter member has actuated said brake means.

2. In a focal-plane shutter for a photographic camera, having a gate aperture for exposure of a film and first and second curtain means each associated with driving means, said first curtain means opening said aperture and said second curtain means thereafter closing said aperture, the improvement comprising gear means in said driving means of the first curtain means, retarding means controlled by said first curtain means and acting upon said second curtain means for limiting to predetermined values the exposure time elapsing between the operation of said curtain means, a disc member on said gear means for co-operation with said retarding means during the run-off of said first curtain means, said gear means having concentrically arranged perforations, a manually operable exposure time setting knob, and an index pin secured to said time setting knob and adapted to engage one of said perforations.

3. In a focal-plane shutter, the improvement according to claim 2, wherein said disc member has a pin attached thereto, said retarding means includes a toothed segment protruding into the path of said pin, and a spring for returning said segment to its initial position, said pin acting upon said segment after said aperture has been cleared by said first curtain means.

4. In a focal-plane shutter, the improvement according to claim 3, further comprising a stationary lever fastened to a rotatable shaft and a spring-biased check lever connected to said shaft, said driving means of the second curtain means having a disc and a stop pin connected thereto, said check lever engaging said stop pin in its locked position, said stationary lever cooperating on the one hand with said index pin and on the other hand with said stop pin.

References Cited in the file of this patent

UNITED STATES PATENTS

| | | | |
|---|---|---|---|
| 1,652,553 | Barnack | Dec. 13, | 1927 |
| 2,673,501 | Duchateller | Mar. 30, | 1954 |
| 2,758,527 | McFadden | Aug. 14, | 1956 |
| 2,928,326 | Loose et al. | Mar. 15, | 1960 |